United States Patent [19]
Ray et al.

[11] Patent Number: 4,868,354
[45] Date of Patent: Sep. 19, 1989

[54] SLIDE SWITCH WITH LIGHT GUIDE

[75] Inventors: Donald L. Ray, Oaklandon; Ellis P. Lipp, Charlottesville, both of Ind.

[73] Assignee: Emhart Industries, Inc., Indianapolis, Ind.

[21] Appl. No.: 248,161

[22] Filed: Sep. 23, 1988

[51] Int. Cl.⁴ .............................................. H01H 3/04
[52] U.S. Cl. ............................... 200/17 R; 200/61.27; 200/317
[58] Field of Search ...................... 200/17 R, 313, 314, 200/316, 315, 317, 61.27, 61.54, 16 R, 311

[56] References Cited

U.S. PATENT DOCUMENTS

| | | | |
|---|---|---|---|
| 3,755,661 | 8/1973 | Bouvrande | 240/2 S |
| 4,288,672 | 9/1981 | Puccini | 200/314 |
| 4,400,685 | 8/1983 | Chestnut | 338/172 |
| 4,408,104 | 10/1983 | Iwata et al. | 200/311 X |
| 4,449,024 | 5/1984 | Stracener | 200/317 |

*Primary Examiner*—A. D. Pellinen
*Assistant Examiner*—Morris Ginsburg
*Attorney, Agent, or Firm*—Carl A. Forest

[57] ABSTRACT

A contact is attached to a carrier and the carrier-contact assembly encapsulated in a chamber in a light guide, the chamber having an open end closed by a circuit board having traces on it. A lever fitting into a lever housing in the carrier passes through a slot in the light guide permitting the carrier to be manually slid within the chamber parallel to the circuit board, thereby moving the contact over the traces. The carrier contacts the light guide wholly along narrow ribs which are greased with a viscous grease. An opaque cover, having a slot through which the lever extends, encloses the light guide. An opaque tape located between the cover and the light guide and having an opening through which the lever extends, slides with the lever to prevent light from escaping through the slot in the cover as the lever is moved. A rim on the lever housing prevents light from escaping around the opening in the tape.

12 Claims, 7 Drawing Sheets

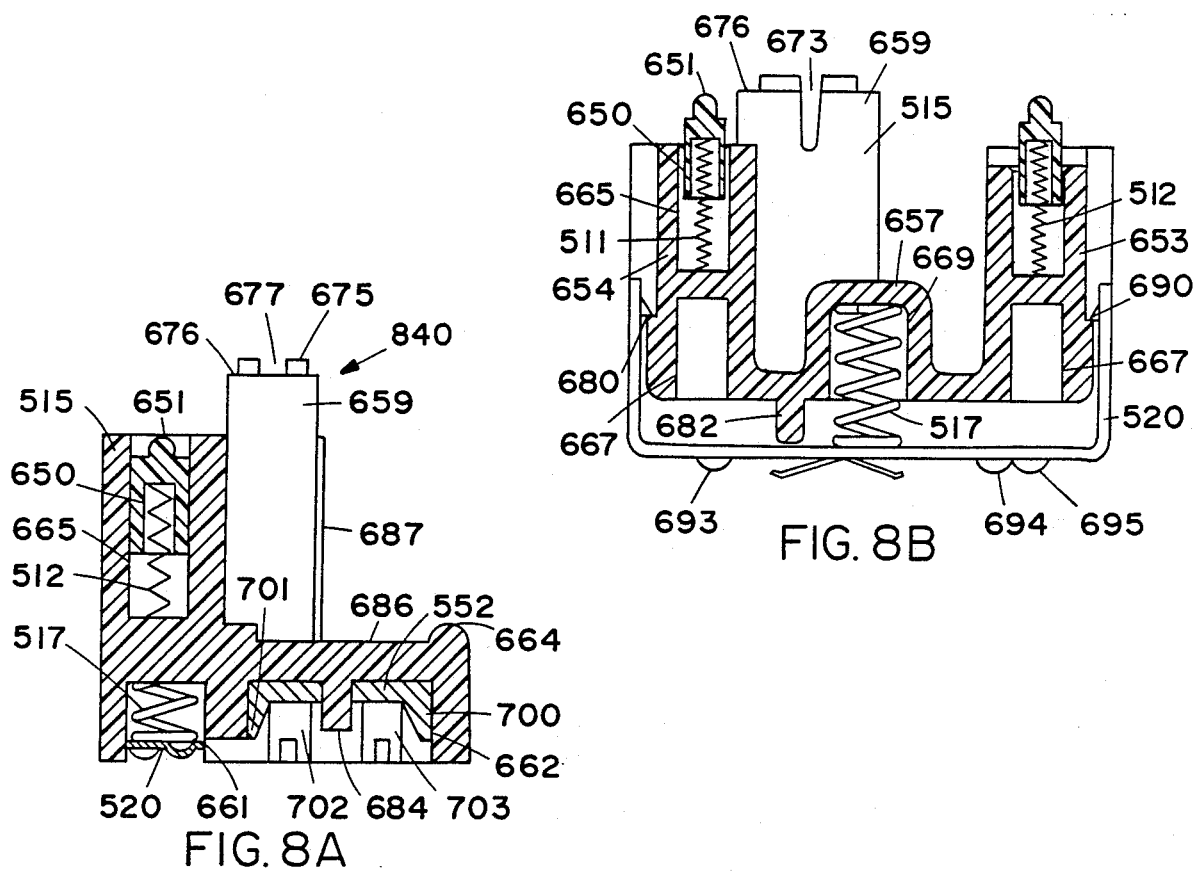
FIG. 8B
FIG. 8A
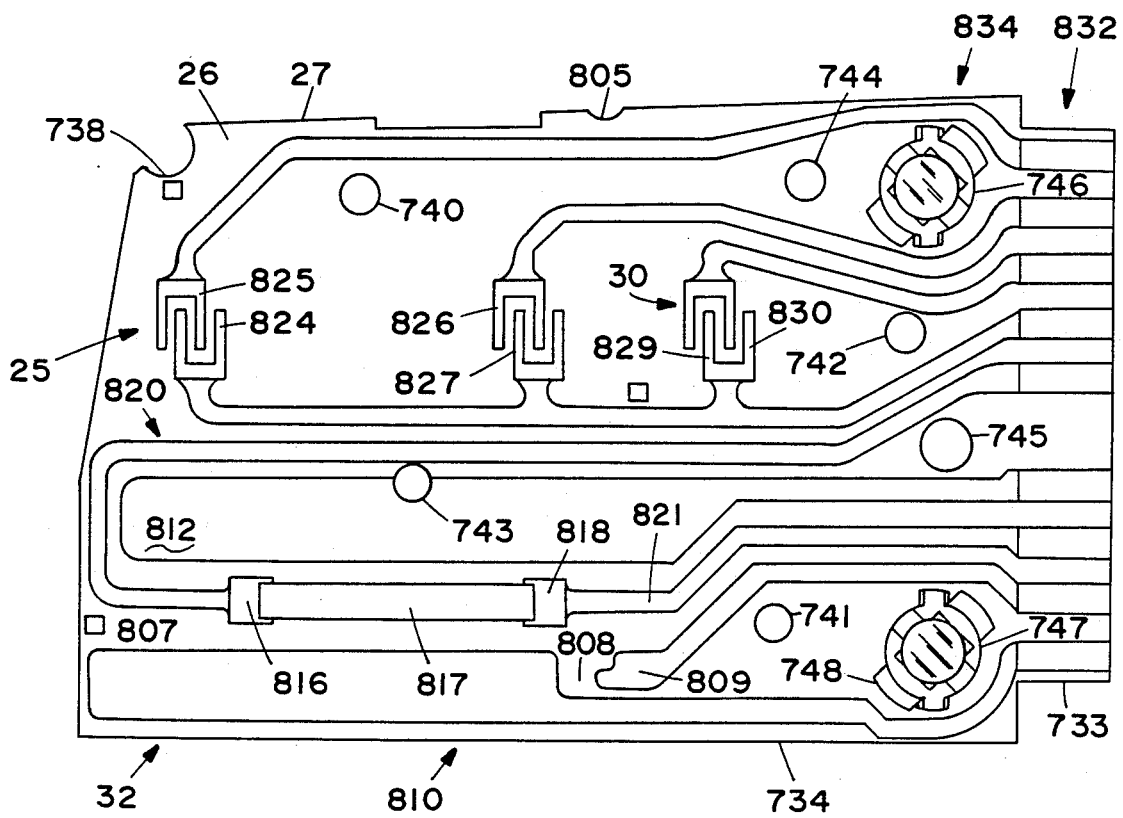
FIG. 9

4,868,354

SLIDE SWITCH WITH LIGHT GUIDE

BACKGROUND OF THE INVENTION

1. Field of the Invention

The invention in general relates to electromechanical switches of the type having lighted indicia indicating the switch setting and more particularly to such a switch that is actuated by a member which slides in a housing.

2. Description of the Prior Art

It is known to encapsulate a button type electrical switch in a housing made of a light guide material which serves to carry light to indicia indicating the setting or function of the switch. See, for example, U.S. Pat. Nos. 4,288,672 issued to Richard E. Puccini, 4,449,024 issued to Steve W. Stracener, and 3,755,661 issued to Andre Maurice Bouvrande. The Puccini patent also disclosed that the switch may be encapsulated in a housing chamber having an open end and a bearing surface, that the open end may be closed with a circuit board which forms part of the switch, and that the button portion of the switch may slide in the bearing surface. However, for more complex switches, such as slide switches, the switch mechanism has generally been enclosed in a separate switch housing, the light guide material has been inserted between the housing and the indicia to be lighted and a lever passed through the light guide material to the switch housing. See for example, U.S. patent application Ser. No. 07/185,353. The more complicated switches present several problems relating to the proper movement of switch parts in the light guide and the need to prevent light from escaping from the light guide at undesirable locations which the present invention addresses.

SUMMARY OF THE INVENTION

It is an object of the invention to provide a sliding type switch in which the switching mechanism, except for the actuation lever, is entirely encapsulated in a housing formed of a light guide material and a circuit board.

It is another object of the invention to provide a sliding type switch that provides the above object and is more compact than prior art sliding switches with lighted indicia.

It is a further object of the invention to provide one or more of the above objects in a switch that includes a sliding actuation lever and a simple and inexpensive means for preventing light from escaping at the juncture of the switch actuation lever and the light guide.

The invention provides a switch comprising: a first housing forming a chamber having an open end, the chamber being made of a light guide material, having an aperture therein, and having a bearing surface thereon; a circuit board substantially closing the open end of the chamber; an electrical circuit including a trace on the circuit board; light means mounted on the circuit board for illuminating the light guide material; a contact carrier slidable within the chamber against the bearing surface and in a plane parallel to the surface of the circuit board; at least one contact mounted on the carrier and engagable with the trace; and lever means extending through the aperture for moving the carrier in the plane to activate the electrical circuit. Preferably, the aperture comprises a slot and the switch further comprises a generally opaque cover means for covering the first housing, the cover means having a slot and one or more light transmitting areas; and opaque tape means located between the housing and the cover for moving with the lever means to prevent light from escaping through the slot in the cover means. Preferably the switch further comprises a means for guiding the tape means around a substantially 90° corner in the housing, which means for guiding preferably comprises a channel in the cover. Preferably, the tape has an opening in it; the lever means comprises a lever member extending through the slot in the housing, the opening in said tape, and the slot in the cover means; and further including an opaque means for preventing light from escaping through the opening in said tape. Preferably, the carrier contacts the chamber bearing surface only along narrow ribs, and a viscous grease is applied to the ribs. Preferably, the contact comprises a low pressure contact means for contacting the trace with a contact force significantly lower than the force normally associated with limb motions of adult humans. Preferably, the first housing includes a detent ramp and the carrier includes detent means for engaging the detent to provide a change in feel in the lever means at a predetermined location relative to the traces on the circuit board.

The switch according to the invention not only eliminates a housing used in prior art devices and provides for light shielding in a simple manner, its simplicity also leads to a high order of reliability. Numerous other features, objects and advantages of the invention will become apparent from the following detailed description when read in conjunction with the accompanying drawings.

BRIEF DESCRIPTION OF THE DRAWINGS

In the drawings:

FIG. 8A shows a cross section of the contact carrier and contacts taken through line 8A—8A of FIG. 7;

FIG. 8B shows a cross section of the contact carrier and contacts taken through line 8B—8B of FIG. 7;

FIG. 9 is a front view of the circuit board of FIG. 1A;

DESCRIPTION OF THE PREFERRED EMBODIMENT

In the preferred embodiment the switch according to the invention is part of a switch module 10 which controls the turn signals, headlight beam change, panel and interior lights and windshield washer and wiper functions. It is understood that the embodiment shown is only intended to be exemplary and not intended to be limiting of the invention. The assembled module 10 is shown in FIG. 2. and is shown in partially exploded form in FIGS. 1A and 1B. The principal subassemblies and their functions will be briefly discussed first to orient the reader to the device, and then a detailed description of each part will be presented. In this description when the words front, back, up and down are used without specific reference to a FIG., then it is in reference to the normal position of the module in use, which is shown in FIG. 2 with the "front" facing to the lower left of the FIG.

Figure 12:
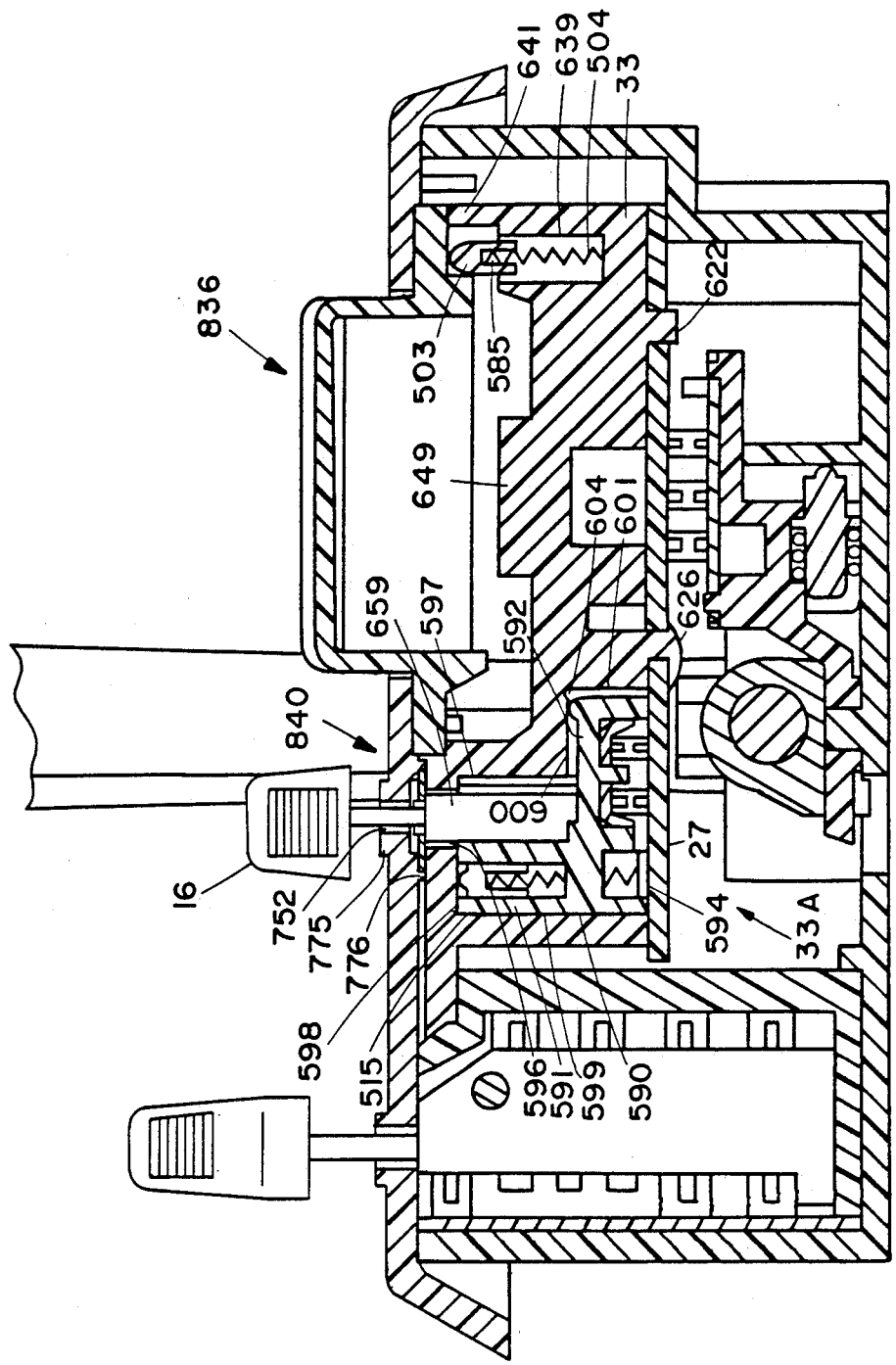
FIG. 12 is a cross section of the preferred module taken through line 12—12 of FIG. 2.

Module 10 has two buttons 12 and 15 and two levers 16 and 17 protruding from its front cover 18 and another lever 19 extending from its left side. Button 12 is a part of a "lights-on" subassembly 23 (FIG. 1A) which activates a circuit 25 on the front 26 of circuit board 27 to turn on the parking lights and headlight of the vehicle. Button 15 is part of a "lights-off" switch subassembly 29 which activates a circuit 30 on the front 26.of circuit board 27 to turn the lights off. Lever 16 is part of a panel light switch subassembly 31 which activates a circuit 32 on the front of circuit board 27 to operate the panel and interior lights of the vehicle. Lever 17 is part of a windshield wiper and washer switch subassembly 35 which operates the windshield wipers and washers of the vehicle. Lever 19 (FIG. 1B) is part of a turn signal and headlight beam change switch subassembly 36 which activates a circuit on the back (not shown) of circuit board 27 to operate the turn signal and headlight beam change functions of the vehicle. A light guide 33 encapsulates subassemblies 23, 29 and 31 and provides lighting for various indicia, such as 34, on front cover 18 (FIG. 2). The light guide 33, the subassemblies 23, 29 and 31 it encapsulates, and the circuit board 27 which attaches to the back of the light guide 33 form a compact and integrated manufacturing unit 33A (FIG. 12). This unit 33A and the various buttons and housing portions associated with it, such as 12, 15 and 18 and lever 16 form a light guide and light switch subassembly 38 which is the subject of the present invention. This subassembly 38 will therefore be discussed in detail below, and the other parts of the module 10 mentioned only as they relate to the invention.

Figure 1A:
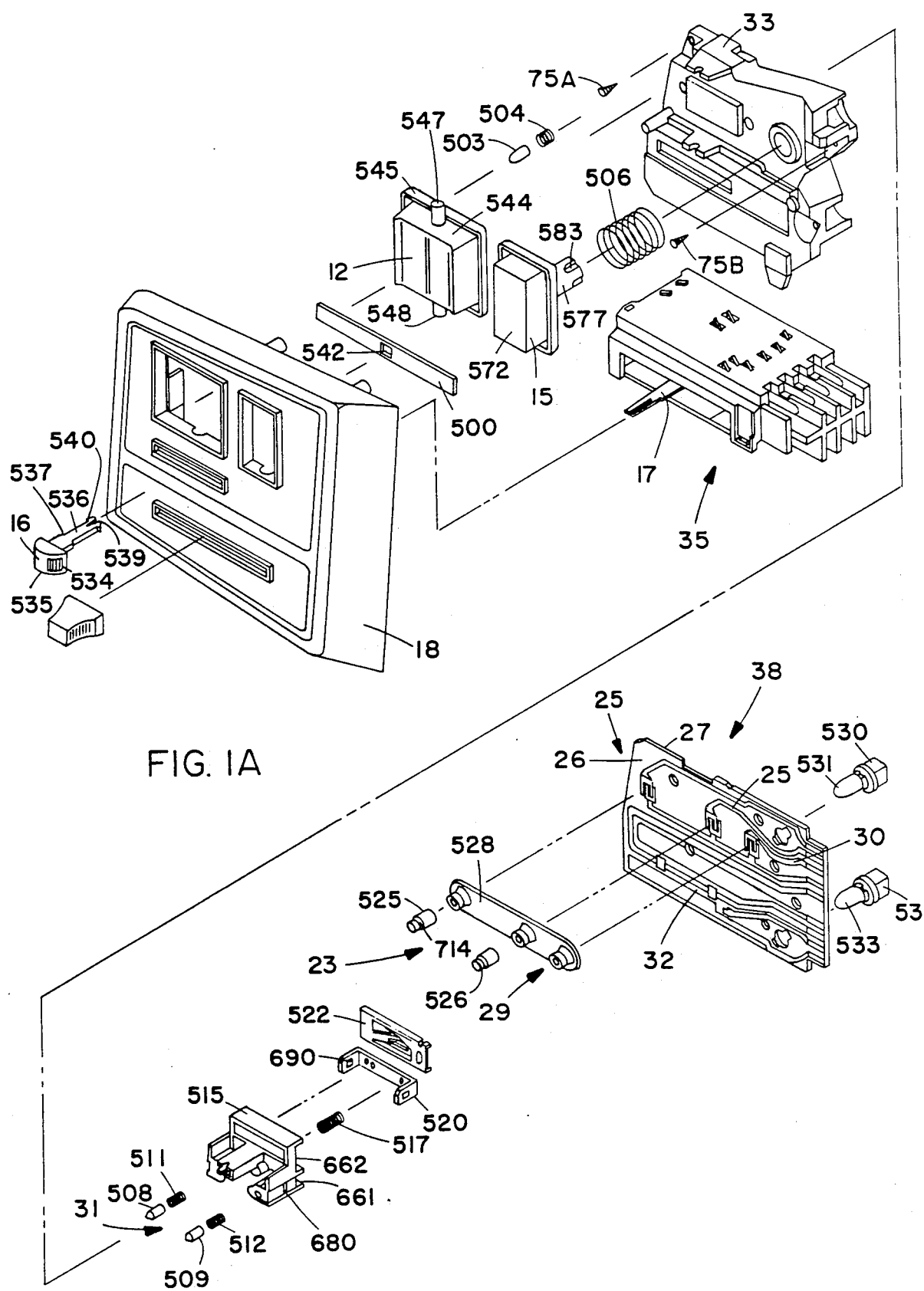
FIGS. 1A and 1B together provide an exploded view of the preferred embodiment of an automotive switch module incorporating the invention.
Figure 1B:
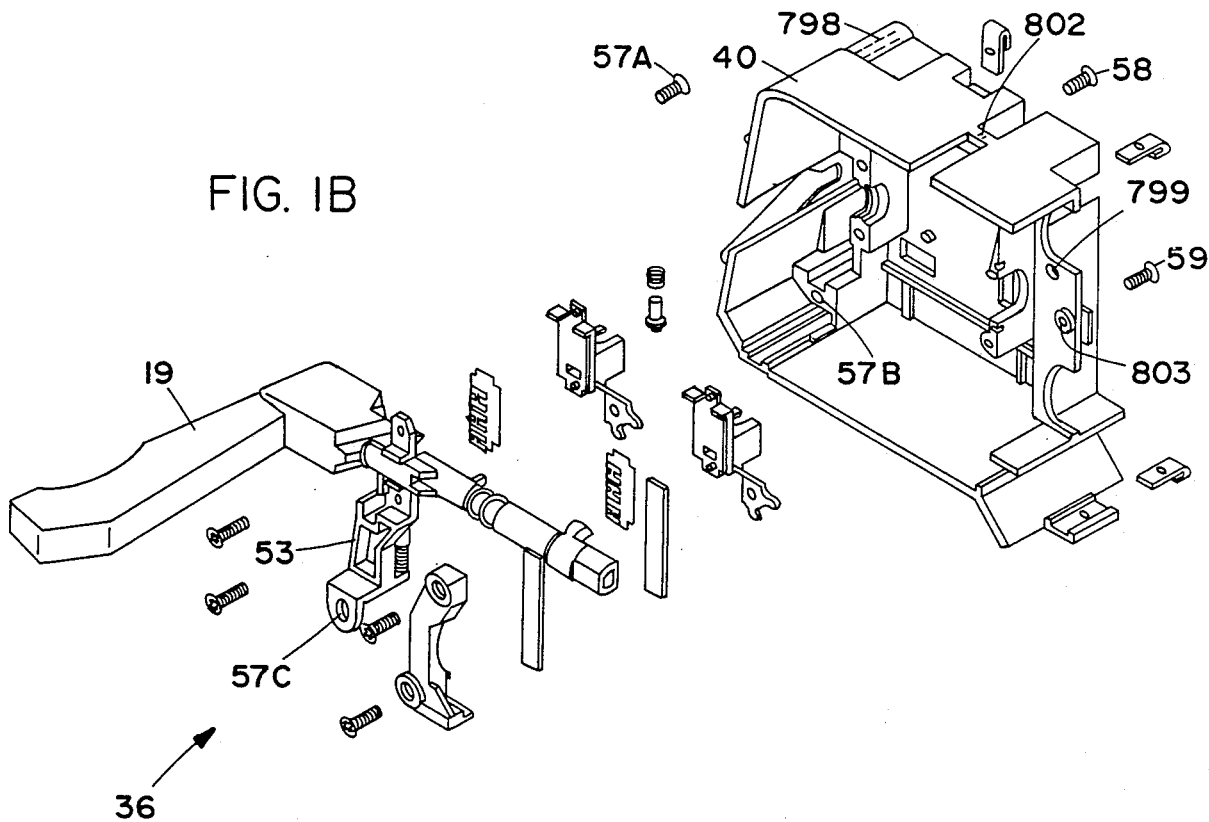
Figure 2:
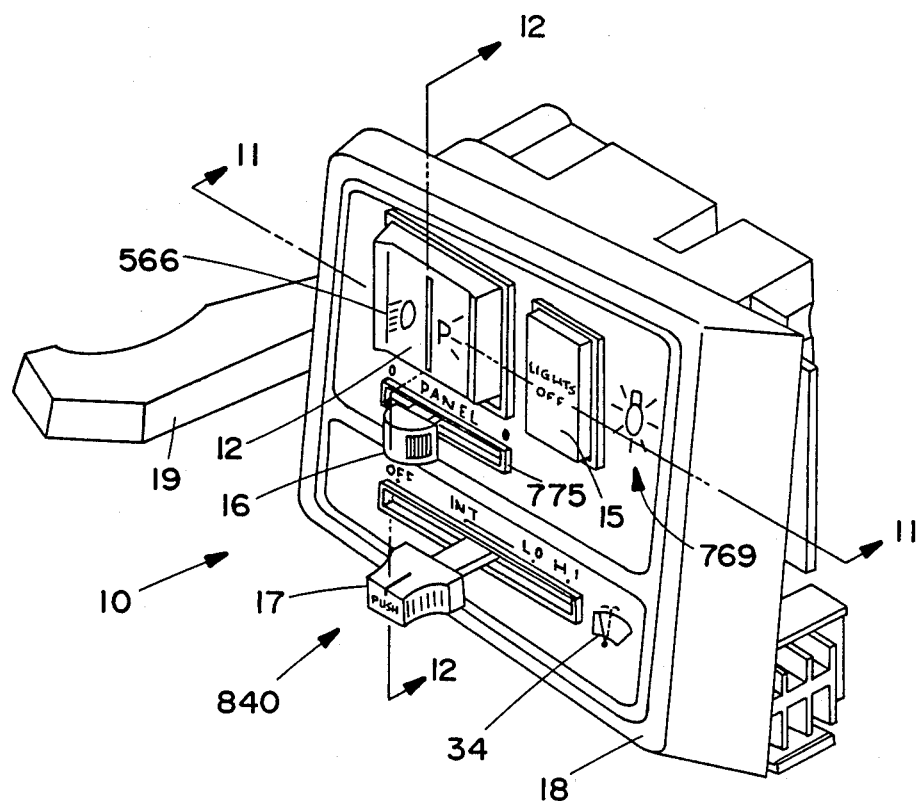
FIG. 2 is a perspective view of the assembled switch module of FIGS. 1A and 1B showing the front side of the module.
Figure 3:
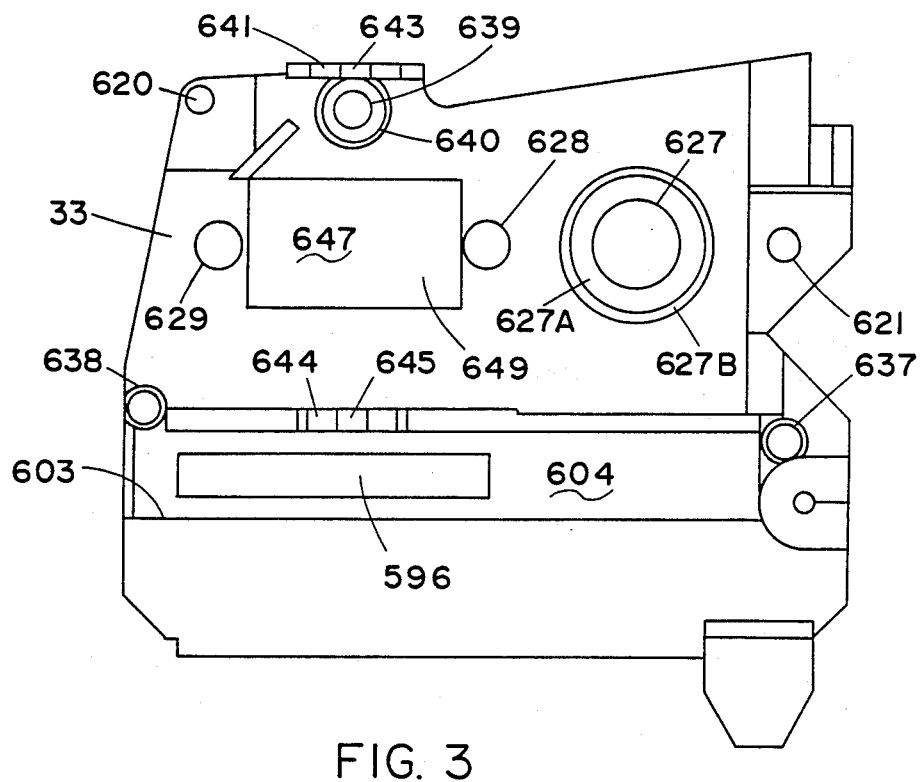
FIG. 3 is a front view of the preferred embodiment of the light guide according to the invention.
Figure 4:
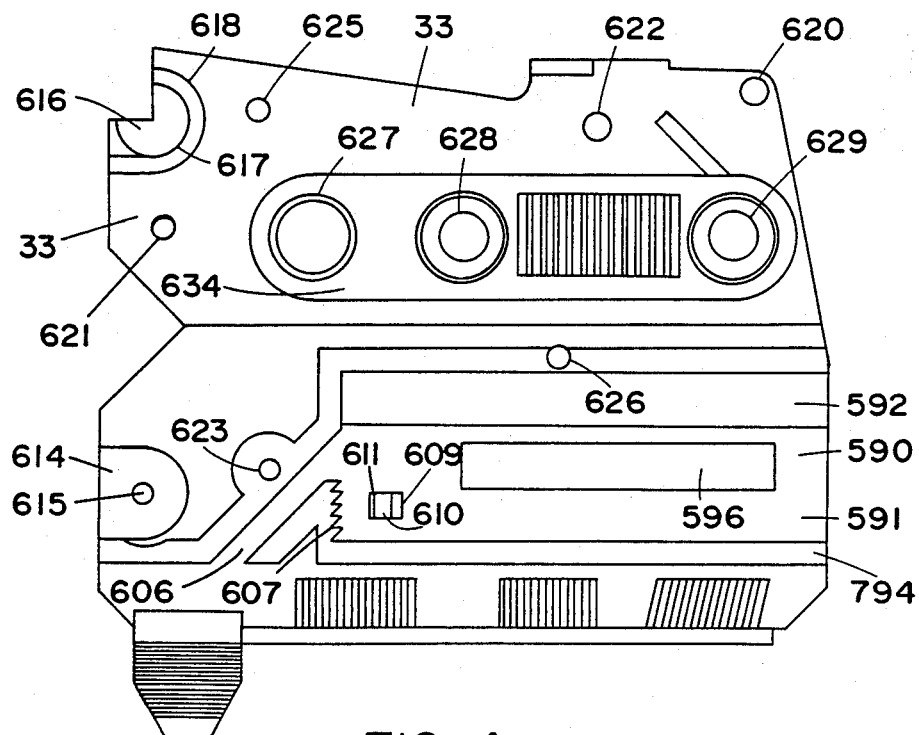
FIG. 4 is a back view of the light guide of FIG. 3.

The preferred embodiment of the light guide and light switch subassembly 38 is shown in an exploded perspective view in FIG. 1A. The subassembly 38 includes lever 16, portions of cover 18 to be discussed below, opaque tape 500, buttons 12 and 15, detent plunger 503, spring 504, spring 506, screws 57A, 58, 59 (FIG. 1B), 75A, 75B, light guide 33, detent plungers 508 and 509, springs 511 and 512, contact carrier 515, spring 517, contact members 520 and 522, switch plunger 525 and 526, elastomeric dome and contact pad 528, circuit board 27, light bulb sockets 530 and 532, and light bulbs 531 and 533. It is understood that while the discussion above and below is in terms of specific parts, shapes, dimensions and materials, the invention is not limited to these particulars which reflect only the exemplary preferred embodiment. Lever 16 comprises an integrally formed knob 534 and shaft 536 centrally located on the knob. Knob 535 is roughly shaped in the form of a half-section of a cylinder having a radius of 0.289 inches and a thickness that is tapered from 0.316 inches where it meets shaft 536 to 0.266 inches at its end. Serrations 534 are formed over a 45° arc on either end of the arc of the half-cylinder. Shaft 536 is 0.066 inches thick and includes a wider portion 0.230 inches long and 0.250 inches wide and a narrower portion 0.582 inches long and 0.198 inches wide, forming a shoulder 537 where the two portions meet. The longer portion includes a pair of prongs 539 having a lip 540. Prongs 539 are 0.219 inches deep to the rounded V between them and 0.093 inches from their tip to the lip 540, and taper from a 0.025 inch radius of the V to a 0.080 gap at their tip. The end of each of the prongs is flat from the interior edge to a distance of 0.094 inches from the center line between them, curves about a 0.020 inch radius, then slopes straight back to lip 540. The lever 16 is made of Nylon TM 6/6 plastic with 30% glass fill. Tape 500 is 0.006 inch thick preferably opaque and black, and preferably having a matt finish. It is 2.438 inches long and 0.250 inches wide with all four corners rounded in a 0.062 inch radius. It has an opening 542 in it which is 0.218 inches long and 0.134 inches wide, with all four corners rounded to a 0.010 inch radius. Opening 542 is centrally located in the tape. Rocker button 12 comprises a cup 544 with a folded back brim 545, pivot pins 547 and 548, lips 550 and 551 (FIG. 11), windows 553 and 554, rib 556, return ramp 560 and contact members 562 and 563. It is integrally formed of high temperature ABS plastic type X-17 except for a thin cap 564 of 0.015 inch thick polycarbonate. Cup 544 has interior dimensions of 0.398 inches deep, 1.098 inches wide and 1.125 inches long with a wall thickness of typically 0.060 inches. The cross section parallel to the opening of the cup 544 is a parallelogram, perhaps best seen in the shape of the aperture 556 (FIG. 10) into which it fits. The angle of the parallelogram is out of square at 3.9°. The exterior dimensions of brim 545 are 0.150 inches high and 1.40 inches wide. Interiorly it is 0.030 inches at its narrowest, 0.110 inches deep and slopes outward at 20°. It is 0.040 inches thick and tapers to a 0.015 inch radius. Pivot pins 547 and 548 each are a 0.120 inch diameter cylinder with the sides perpendicular to the plane of the cup opening cut off flat and spaced 0.10 inches. They extend perpendicular to the side of cup 544 and are centered on the point where a 3.9° line with the perpendicular cuts the outer circumference of the cup 544. They extend 0.082 inches beyond brim 545. Lips 550 and 551 extend 0.059 inches above the front surface of the cup 544 and are defined as follows: their outer edge makes a 7° angle with the vertical (FIG. 11), the tip of the lip is a 0.049 inch radius and the revese curve in to blend with the surface of the cup is a 0.118 inch radius. Windows 553 and 554 are 0.380 inches on each side with their sides parallel to those of cup 544. The windows go entirely through the ABS plastic, however are covered by the 0.015 inch thick polycarbonate cap 564. Rib 556 is a U-shaped trough 1.125 inches long, an exterior width of 0.170 inches, an interior depth of 0.045 inches and a wall thickness of 0.045 inches, or including the polycarbonate cap, 0.060 inches in the vertical direction in FIG. 11. The lower edges of rib 556 are angled at 45°. Return ramp 560 is 0.040 inches high and its inner sides are angled at 20° while its outer sides are angled at 30°. It is centered under pin 547 and extends the width of the lower (FIG. 11) edge of brim 545. Contact members 562 and 563 are oblong with sides parallel to the sides of the parallelogram referenced above, 0.050 inches wide, 0.035 inches high, 0.125 inches long, and with the lower (FIG. 11) edges rounded in a 0.020 radius. Windows 553 and 554 are screen printed with graphics such as 566 (FIG. 2), symbolizing the headlight and parking light functions. Button 15 is similar to button 12 in its cup shape with brim 568 and parallelogram cross section with 3.9° basic angle, and having a window 569 covered with 0.015 inch thick polycarbonate The basic exterior dimensions of the cup 572 are about 1.125 inches by 0.594 inches wide and 0.382 inches deep. Window 569 is 0.376 inches by 0.425 inches Button 15 also includes an arc-shaped groove 5.74 having an inner radius of 0.281 inches and an outer radius of 0.328 inches and a depth of 0.030 inches. This groove 574 cuts through the cup and brim 568 on both the long sides and serves as a seat for spring 506. Button 15 further includes a location projection (not shown) and two pins (nLt shown) on the inside surface of cup 572 which are used to attach a light pipe 577. Otherwise the dimensions of buton 15 are similar to those of button 12 with slight differences to appropriately account for their different operation and general size. The material is the same as button 12. Light pipe 577 is roughly a cylinder 579 of 0.344 inches diameter and 0.760 inches long with an inner bore 580, 0.156 inches in diameter, and a flange 581, 0.125 inches wide by 0.875 inches long and 0.062 inches thick. Flange 581 has two 0.094 diameter holes (not shown) though it which fit over the pins in cup 572 which are spin staked to attach the light pipe 577 to cup 572. The light pipe 577 includes grooYes 583 (FIG. 1A) to facilitate light entering the pipe and to direct the light to light window 569 in button 15 and is of optical grade clear polycarbonate, virgin material. Plunger 503 is bullet-shaped with an outside lindrical diameter of 0.156 inches, an inner bore 585 (FIG. 12) of 0.98 inches with a 0.015 inch 45° chamfer at the open end of the bore 585, and a rounded 0.015 radius at the inner end circumference of the bore. The working end of the plunger 503 is rounded with a 0.078 inch radius smooth spherical radius, the plunger is 0.275 inches long and the bore 585 is 0.115 inches deep. The detent plunger 503 is made of free machining brass. Spring 504 is a coil spring made of 0.010 inch diameter pre-tinned music wire. The coils have an outside diameter of 0.090 inches and a free length of 0.20 inches, closed at both ends. There are six active coils minimum. Spring 506 is a coil spring made of 0.085 inch diameter steel music wire with approximately five turns and an inside diameter of 0.583 inches. It has a 0.540 inch free length. Screws 75A and are No. 4 screws. Light guide 33 is an integrally moldeo piece of optically clear acrylic, virgin material. The light guide 33 comprises a firsthousing for the switch assemblies 31, 23 and 29. It includes a roughly L-shaped chamber 590 which encloses carrier 515 and contact members 520 and 522. The L-shape is perhaps best seen in FIG. 1 and includes a thick upright portion 591 and a thinner foot portion 592. chamber 590 has an open end 594 that is closed by circuit boarH 27. Chamber 590 also has an aperture 596 through which lever means 16 extends. The chamber also includes bearing surfaces 597, 598, 599, 600 and 601. Chamber 590 has a slightly tapered shape to help in removing it from the mold. The upright portion is 0.460 inches wide at the interior (uoper in FIG. 12) end, tapers at ½° to 0.475 inches at 0.230 inches from the end, and is 0.643 inches long. The foot portion 592 extends 0.24 inches beyond the upright portion, is 0.230 inches high,and has a 0.015 inch radius lip 604 formed at the tip of the foot. The chamber 590 is 2.031 inches long in the direction parallel to aperture 596 (FIG. 4). Aperture 596 is a slot 1.314 inches long by 0.188 inches widelwith its four corners rounded with a 0.020 inch radius. The wall thickness of guide 33 such as at the left and top of chamber 590 in FIG. 12 is typically 0.80 inches. A 0.10 inch wide channel 606 opening into chamber 590 runs at 45° from the left end of foot 592 (FIG. 4) and five 0.050 inch-high 45° prisms 607 are formed in the chamber wall at the same end. The channel 606 and prisms 607 direct the light to the areas above and below the chamber 590 where indicia are located in over 18. A detent ramp 609 is formed in the upper wall of chamber 590. This ramp 609 extends 0.032 inches from the wall at its maximum extension 610 and indents 0.025 inches into the wall at its minimum indentation 611 with 0.070 inches between the maximum and minimum and the sides of the ramp being at 40° to the perpendicular to the wall of the chamber. The back of the light guide 33 (FIG. 4) also includes channel 614 which is 0.400 inches wide (in the vertical direction in FIG. 4) and 0.384 inches long (in the horizontal direction in FIG. 4) with the inner wall a semi-circular arc about a 0.2 inch radius. The depth of channel 614 along the axis of the above radius is 0.531 inches. A 0.080 inch diameter hole 615 is centered on the same axis. Another channel 616 is also formed in the back of light guide 33. Channel 616 has an upper bore 618 of the same dimensions as channel 614 except it is only 0.200 inches along the bore axis including a 45° chamfer at its bottom. Inner bore 617 is 0.312 inches in diameter and as long along the bore axis as channel 614. Channels 614 and 616 provide pockets within light guide 33 for the lights 531 and 533. The back side of light guide 33 also has 0.130 inch diameter bores 620 and 621 through which screws 75A and 75B pass for attaching tne light guide to housing 40; locator pins 622 and 623 which are 0.115 inches in diameter and 0.055 inches high, and posts 625 and 626 are 0.094 inches in diameter and 0.125 inches high before they are spin staked to attach the circuit board 27 to the light guide 33. The light guide 33 also has a 0.355 inch bore 627 which allows button light guide 577 to pass through the light guide 33. A ring 627A of 0.562 inches diameter and a groove 627B of 0.656 inches diameter are concentric about bore 627. Two bores 628 and 629 of 0.225 inches diameter flare to a 0.355 inch diameter along a 45° cone segment, such as 630 (FIG. 11); these bores 628 and 629 each have a 0.198 inch diameter neck 632 at the end opposite the flare and receive switch plungers 525 and 526. The back of the light guide also includes a well 634 0.055 inches deep and shaped to receive contact pad 528. The front of light guide 33 (FIG. 3) includes locating pins 637 and 638 adapted to mate with recesses in cover 18, and a 0.160 inch diameter and 0.250 inch deep bore 639 to receive spring 504 and plunger 503, with a ring shaped collar 640 0.281 inches in diameter and rising 0.050 inches above the light guide surface around the bore. The front of light guide 33 also includes a flange 641 that is 0.376 inches wide at its narrowest part, tapers at 15° to the vertical (FIG. 3) and includes a 0.125 inch diameter half-circular bearing surface 643 for supporting pivot pin 547 of button 12. A similar flange 644 and bearing 645 supports pin 548. The two flanges 641 and 644 extend 0.250 inches above the surface 647 of bench 649 together with prisms 648, which directs light into button 12. Bench 649 is 0.890 inches long, 0.33 inches wide and 0.080 inches high. The light guide 33 is 0.763 inches thick, from the top of flanges 641 and 644 and the other portions that contact cover 18 to the surface that contacts circuit board 27. There is a slight rise of about 0.015 inches in the surface 604 of the light guide 33 to form a ridge 603 parallel to slot 596. The light guide 33 also includes other prisms, channels, flanges and other structures to guide the light to the indicia, the principals of which guiding functions are known in the art.

Figure 5:
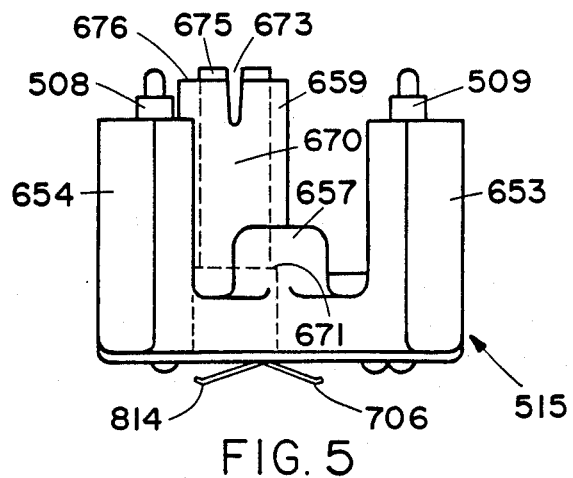
FIGS. 5, 6 and 7 show bottom, back and front views respectively of the preferred embodiment of the contact carrier with its contacts.
Figure 6:
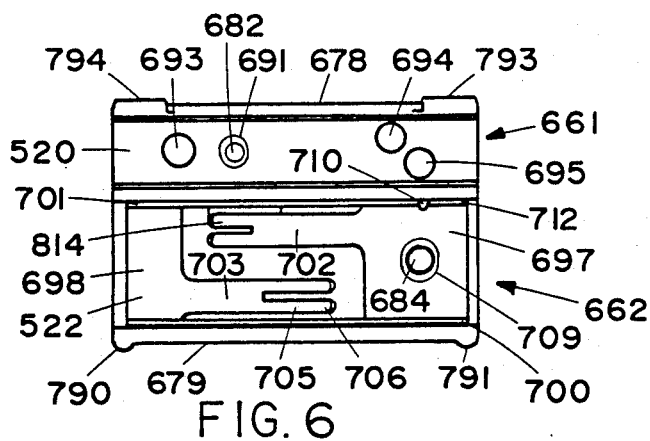
Figure 7:
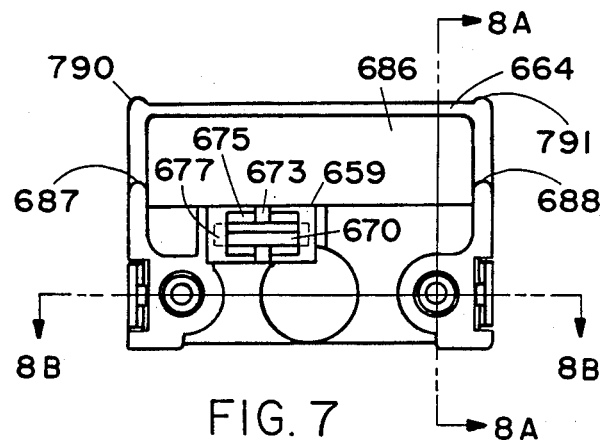

The contact carrier 515 and contact members 520 and 522 are shown in FIGS. 5 through 8B. In FIGS. 5 and 8B the detents 508 and 509 and the contact members 520 and 522 are shown extended as when they are not in chamber 590. In FIG. 8A they are shown in the position they take in the assembled device with the carrier 515 in chamber 590. The contact carrier detents 508 and 509 are identical. They are made of acetal plastic, such as Celcon TM, and are cylindrical 0.125 inches in diameter with a 0.010 inch flat on one side. They have an internal bore 650 0.066 inches in diameter and a spherical tip 651 0.062 inches in diameter and 0.050 inches high. Coil springs 511 and 512 are each made of 0.007 inch diameter music wire, are 0.057 inches in outside diameter and 0.300 inches in free length, with a working length of 0.187 inches. Contact carrier 515 is shown in FIGS. 5, 6 and 7. It comprises two detent posts 653 and 654, a contact spring housing 657, a lever housing 659, an interior light contact member channel 661, a panel dimmer member contact channel 662 and a bearing rim 664. Detent posts 653 and 654 are mirror images of one another. Each has a bore, such as 665, 0.125 inches in diameter and 0.281 inches deep with a chamfered opening, and a core, such as 667, the same diameter and 0.204 inches deep. Contact spring housing 657 includes a bore 669 having an inner diameter of 0.172 inches and a length of 0.204 1nches with a 0.062 inch radius about the inner circumference of the bore 669. Lever housing 659 is 0.300 inches by 0.162 inches in the plane of FIG. 7, which are also the outer dimensions of rim 676, and is 0.744 inches high from the lowest edge of the carrier 515 in FIG. 8A to the rim 676. It includes an inner channel 670 which passes entirely through the carrier. The channel 670 is of rectangular cross section 0.064 inches wide by 0.20 inches breadth to snugly hold shaft 536 of lever 16 and broadens to 0.250 inches in breadth at a depth of 0.484 inches to form a shoulder 671 to catch lip 540 of lever 16. The upper end of lever housing 659 in FIG. 5 has a U-shaped slot 673 0.125 inches long and 0.040 inches wide at its open end and rounded in a 0.015 inch radius at its closed end. It also has a raised rim 675 0.032 inches high, 0.031 inches thick, extending along the breadth of channel 670 and cut by slot 673 to form four parts and forming a horizontal rim 676 which functions to prevent light from escaping through the slot 542 in tape 500. The slot makes the top of lever housing 659 somewhat flexible to accept shaft 536 and the rim 675 forms a slot 677 perpendicular to slot 673 which the proximal end of shaft 536 (the end nearest knob 535) slips into as should 537 seats on the rim 676 of lever housing 659, sandwiching the tape 500 between shoulder 537 and rim 676. The exterior dimensions of carrier 515 define a rough L-shape to fit into chamber 590 These dimensions are 1.00 inches long by 0.688 inches wide at the base of the L and 0.458 inches wide through the upright part of the L (above rim 664), by 0.653 inches high to the top of posts 653 and 654 in FIG. 5. The walls of carrier 515 are indented by 0.010 inches at 678 and 679 (FIG. 6) so that contact with bearing surfaces of chamber 590 are at the well-defined ribs 790, 791, 793 and 794 at the ends of the carrier. The walls of the various partssuch as posts 653 and 654, housing 657 and housing 659 are typically 0.050 inches thick. Channel 661 is 0.195 inches wide by 0.100 inches deep along the bottom (the side facing circuit board 27) and the samewidth along the sides. However, the depth along the sides is 0.025 inches for a distance of 0.265 inches from the bottom, then becomes 0.05 inches to form a 0.025 inch shoulder 680 on each side. A pin 682 0.090 inches high and 0.055 inches in diameter with a 0.010×45° chamfer at the end is formed 0.163 inches from the midline of the carrier 515 (FIG. 6) on the center line of channel 661. The bores, such as 665 and 669 are also located along the centerline of channel 661. Channel 662 is 0.125 inches deep by 0.360 inches wide and extends along the length of the carrier. A pin 684 0.089 inches in diameter and 0.115 inches long with a 0.010×45° chamfer at the end is formed 0.347 inches from the vertical middle line of the carrier 515 (in FIG. 6) and along the middle line of channel 662. The carrier is indented at 686 to form a bearing rim 664 0.050 inches thick and 0.050 inches high about the to of the fool portion of the "L". With the dimensions given above, the walls of the upright portion of the "L" extend out beyond the housing 659 at 687 and 688. These ribs 664, 687 and 688 also serve to precisely locate the contact areas of the carrier with the bearing surfaces of chamber 50. The carrier 515 is made of M-270-14 Celcon TM. Spring 517 (FIG. 8B) is made of 0.014 inch diameter pre-tinned music wire. It has 9 active coils of 0.0150 inches outside diameter. The coils are closed at both ends, the free length is 0.400 inches, the working length is 0.240 inches and the compressed height is 0.143 inches. It exerts a force of about 225 grams at its working length. Interior light contact member (shorting bar) 520 is made of 0.025 inches thick CDA 260 brass, ½ hard. It is bent into the shape of a broad "U" with the bends forming a 0.025 inch radius. The "U" has inside dimensions of 0.350 inches in height, 0.0936 inches in breadth, and 0.180 inches wide. The ends are lanced to form inward projections, such as 690, at each side of the U. The projections 690 are wedge shaped, 0.072 inches wide at the base, 0.062 inches wide at the top, being 0.062 inches from the side of the U. An oblong hole 691 0.078 inches long across the width of the member 520 (the vertical direction in FIG. 6) and 0.062 inches wide, with radiused ends of 0.031 inches radius is formed 0.301 inches from the left end of the member 520 in FIG. 6 and centered on the middle line of the member. The member 520 is dimpled in three places to form contacts 693, 694 and 695. The dimples are spherical with a spherical radius of 0.045 inches and extend 0.025 inches from the base of the U. Contact 693 is centered on the midline of the member 520 and 0.156 inches from the center of hole 691. The centers of contacts 694 and 695 are each spaced 0.035 inches from the midline of member 520 and that of contact 694 is 0.585 inches along the length of the member from the center line of contact 693 while that of contact 695 is 0.080 from the center-line of contact 694 in the same direction. Panel dimmer contact spring member 522 is made of 0.012 inch thick CDA 688 brass, ½ hard and tempered to about 105,000 psi. It comprises plates 697 and 698, side flanges 700 and 701, and sprng blades 702 and 703. The contact spring member 522 is formed from a single piece of brass. The exterior dimensions of member 522 are 0.938 inches long and 0.350 inches wide (the horizontal and vertical directions respectively in FIG. 6). The height of flanges 700 and 701 is 0.090 inches. Plate 697 is 0.281 inches in breadth and plate 698 is 0.157 inches. The blades 702 and 703 are each 0.400 inches long from their juncture with the plate to the contact, such as 706, on its tip, and 0.086 inches wide, and the side closest to the flange 700 or 701 is spaced 0.040 inches from the outside of the flange. The juncture of the blades and the plates is rounded in a 0.032 inch radius. Each blade 702 and 703 is divided into two fingers, such as 705, each of which has a contact, such as 706, formed at its end. The finger 705 starts 0.225 inches from the base of the blade and is 0.032 inches wide. The contact is formed by a 0.032 inch radius over a 60° arc from the perpendicular to the blade 0.400 inches from its base. The free height of the contacts, such as 706, is 0.182 inches above the plate surface that contacts carrier 515 while working height is 0.113 inches. An oblong hole 709 is formed in plate 697 centered 0.125 inches from the outer end and along the midline of the spring member 522. Hole 709 is 0.094 inches wide and 0.134 inches long with its ends rounded in 0.047 inch radii. A notch 710 is cut through flange 701 0.094 inches from the right end in FIG. 6. Notch 710 is 0.032 inches wide and rounded with the same radius. The end of flange 701 is bent out 0.020 inches to form a spring tab 712 which holds the member 522 in place in channel 662 in carrier 515 during assembly. Switch plungers 525 and 526 (FIGS. 1A and 11) are identical. They are formed of Celcon TM. They are cylindrical in shape, with one end being of 0.219 inches diameter and the other being of 0.188 inches diameter to form a shoulder 714. The shoulder 714 is rounded with a 0.005 inch radius and the narrower end has a circumferential 0.010×45° chamfer. The wider cylinder is 0.188 inches long and has a 0.010 inch deep flat formed on one side. The narrower cylinder is 0.155 inches long. The switch pad 528 is made of silicon rubber. Its base 717 is 0.047 inches thick 2.260 inches long and 0.500 inches wide with the ends rounded with a 0.250 inch radius. Pad 528 has three domes 718, 719, and 720 formed in it. Each dome is roughly the same in shape. Thus only 719 shall be described. It has a 0.016 inch thick cone 721 sloping up to a ring 722 which is 0.197 inches in outside diameter and 0.158 inches in inside diameter. The top (FIG. 11) of ring 722 is 0.158 inches above the bottom side of base 717. The inside diameter of the dome where it joins the base 717 and the outside diameter is 0.296 inches. Dome 719 alsu has a centrally located, cylindrical preload pad 724 which is 0.98 inches in diameter and the top of which is 0.168 inches above the bottom of base 717. An inner cylindrical contact pad 726 is 0.118 inches in diameter and has a 0.025 inch thick contact 727 formed in its end. The contact area is carbon impregnated silicon rubber. The surface of contact 727 is 0.088 inches above the bottom surface of base 717. A 0.040 inch wide and 0.012 inch deep venting groove 730 in base 717 connects the three domes 718, 719 and 720. The center of dome 720 is located 250 inches from the end of the base 717, the center of dome 719 is located 0.635 inches from the center of dome 720, and the center of dome 718 is 1.125 inches from the center of dome 719, all on the center line of base 717. The precise dimensions, particularly of cone 721 and ring 722 are adjusted so that dome 720 has an activation force of about 275 grams while domes 719 and 718 have actuation forces of about 175 grams.

Figure 10:
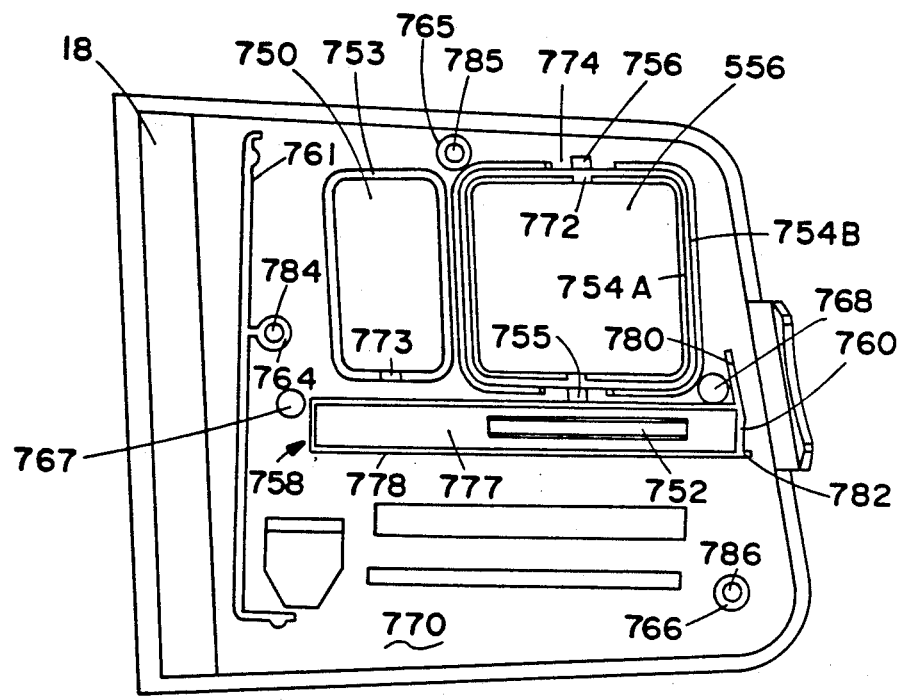
FIG. 10 shows a plane view of the back of the preferred module cover.
Figure 11:
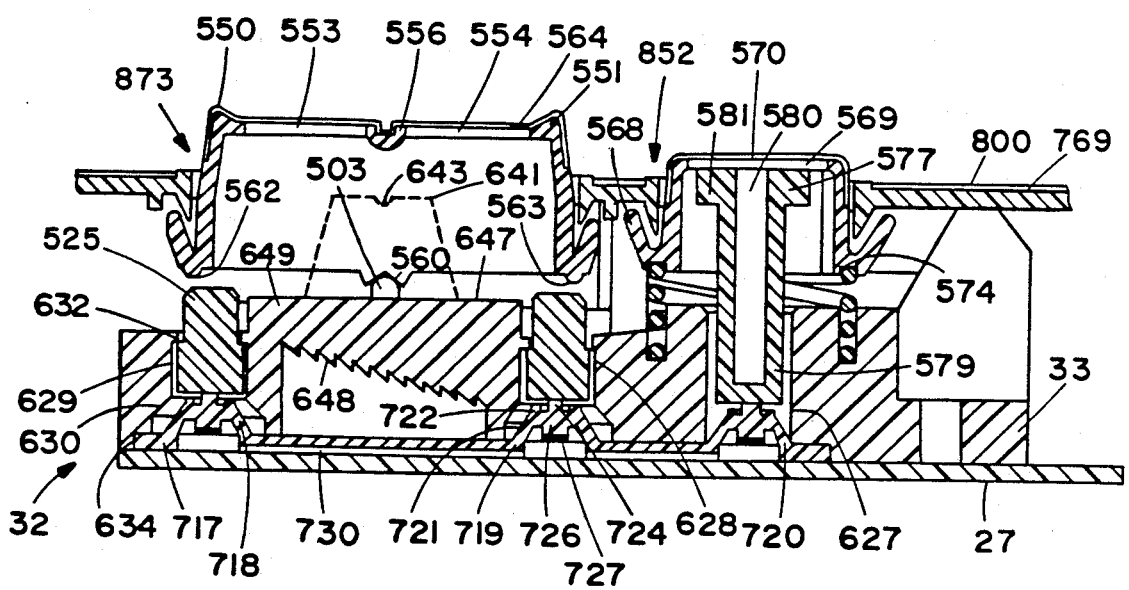
FIG. 11 is a cross section of the cover, light guide, circuit board and associated parts taken through line 11—11 of FIG. 2.

The side of the circuit board 27 that engages the light guide 33 and switch assemblies 31, 23 and 29 is shown in FIG. 9. The board 27 is made of 0.062 inch thick General Electric TM PC 75. The circuits such as 25, 30 and 32 are formed by conventional screening and etching techniques and are preferably 2 ounce copper except as noted below. The board 27 is roughly rectangular with a flange 733 at one end. The board 27 is 2.141 inches wide at its widest where flange 733 joins the main portion 734 of the board, and portion 734 is 3.115 inches long at its longest along the bottom edge of FIG. 19. Flange 733 is 0.312 inches by 1.855 inches. The lower edge and left side dimension in FIG. 9 conform to the exterior dimensions of the mating parts of light guide 33 while the upper side also conforms to the light guide exterior dimension but does not indent as far as the light guide does along the top of FIG. 3. The board has a 0.094 inch radius notch 738 at its upper left corner, and bores of the following size: 0.125 inch diameter bores 740, 741, and 742; 0.109 inch diameter bores 743 and 744; 0.108 inch diameter bore 745; and bores 746 and 747 which are each 0.320 inch diameter bores with a cross slot, such as 748, which is 0.170 inches in width and has curved ends defined by a 0.430 inch diameter arc. The position of these bores will be evident from the description of the light guide given in detail above and the description of the assembly of the various parts of the invention which will be described below. Lamp sockets 530 and 532 are purchased from JKL Components Corporation of Pacoima, Calif. and are their model No. 2918 socket and clip assembly. Lamps 531 and 533 are Stanley type bulbs whic may be purchased from the same corporation, preferably model No. JKL E21203A or JKL E73. Housing cover 18 is an integrally molded piece of high temperature ABS preferably CYOLAC X17 TM available from Borg Warner Corporation of Parkersburg, W.V. FIG. 10 is a back view of cover 18 showing the parts that interact with the light guide 33 and other parts just described. These parts include apertures 556 and 750, slot 752, rims 753, 754A and 754B which form part of labyrinths 873 and 852 for preventing light from escaping around the buttons that fit in the apertures, oearings 755 and 756 for pivot pins 548 and 547 respectively, means 758 for guiding tape 500, flanges 760 and 768. The other parts of the cover 18 are either related to other inventions than the present one or qetermined by specific customer requirements and thus won't be discussed herein. Apertures 556 and 750 are parallelograms with the same basic angles as the buttons 12 and 15. Aperture 556 is 1.56 inches by 1.250 inches while aperture 750 is 1.56 inches by 0.625 inches. Rim 754A tapers so that the aperture 556 widens from the dimension given above to 1.176 inches by 1.270 inches at the inner edge of the rim. It extends from a height of 0.015 inches above the outer (front) surface 796 of cover 18 to about 0.085 inches above the inner surface 770 with a typical cover thickness of about 0.090 inches. Rim 754B has inner dimensions of 1.440 inches by 1.345 inches at its base and has a 1° draft. It extends 0.150 inches above the cover 18 inner surface 770 and is typically 0.045 inches thick. The groove between rims 754A and 754B is cut 0.032 inches into the typical cover thickness. Rim 754A has a 0.010 inch radius at its tip and angles outward ahd towards the cover at 15° to the perpendicular to the cover with both rims radiused with a 0.015 1nch radius where they meet the bottom of the groove between them. A 0.125 inch wide slot, such as 772, with a depth of 0.117 inches and radiused at the full radius of its width is formed in rim 754A where a central vertical cuts it. Likewise a slot, such as 774, is formed in rim 754B in the same two places, which slot is 0.396 inches wide at its base and tapers wider at a 15° angle. Bearings 755 and 756 are of a 0.0675 radius and are formed 0.032 inches into surface 770. Rim 753 extends 0.1 inch above surface 770 and 0.015 inches above the front surface 769 of cover 18. The portion extending beyond the front surface 769 is 0.025 inches thick while the portion extending above surface 770 is about 0.010 inches wide at the tip and angles outward to surface 770 at 25.6 degrees. A keyway 773 is formed in the center of the lower edge (FIG. 10) of rim 753. Keyway 773 is 0.130 inches wide, flares inward at 45° for a 0.032 inch depth, then drops perpendicularly penetrating into surface 770 to a depth of 0.057 inches. Slot 752 is 1.262 inches long and its centerline along its long axis is located 0.952 inches from the centerline of aperture 556, while its right end in FIG. 10 is located 0.734 inches horizontally from the axis of bearings 755 and 756. The width of slot 752 is stepped, being 0.148 inches wide for a depth of 0.020 inches then 0.98 inches wide for the rest of its depth. A rim 775 0.025 inches thick extends 0.045 inches above the outer surface of cover 18 about slot 752. Guide means 758 comprises a channel 777 formed by a rim 778 on surface 770 and extending up flange 760 Rim 778 is 0.015 inches high and 0.031 inches thick. Channel 777 is 0.281 inches wide. Its left end in FIG. 10 is located 1.678 inches from the axis of bearings 755 and 756, while its right end is located 1.035 inches from the same axis. Shield and guide flange 760 extends 0.794 inches from surface 770. It is 0.040 inches thick. The channel 777 is smoothly curved as it passes from surface 770 to flange 760 following a radius of 0.200 inches. The upper portion 780 is angled at 10.82 degrees with the channel 777 portion. A 0.040 inch thick rib 782 extends out to a line parallel to the left edge of portion 760 to brace the flange 760. Flange 761 is 3.070 inches long 0.763 inches high by 0.040 inches thick. Its upper end in FIG. 10 is 0.888 vertical inches from the midline of apertures 556 and 750 and its inner surface is spaced horizontally 2.12 inches from the axis of bearings 755 and 756. Post 764 is centered 0.374 inches and 1.938 inches from the same reference lines is 0.236 inches in diameter, and 0.763 inches high. A bore 784 0.089 inches in diameter and at least 0.375 inches deep is formed in its center. It is connected to flange 761 by a 0.040 inch thick wall. Post 765 and bore 785 have the same oimensions as post 764 and bore 784. and are centered 0.77 inches and 0.812 inches from the previously mentioned horizontal and vertical reference lines respectively. Post 766 and bore 786 have the same dimensions as post 764 and bore 784 except the post 766 is 0.167 inches shorter than post 764. Post 766 is located 1.947 inches and 1.032 inches from the above mentioned horizontal and vertical reference lines. Wells 767 and 768 are each 0.1875 inches in diameter and extend through the wall of cover 18 (but not the polycarbonate 800). Well 768 is located 0.672 inches from the centerline of apertures 750 and 556 and 0.875 inches from the axis of bearing 755 and 756. Well 767 is 2.703 inches horizontally and 0.140 inches vertically from well 768.

The light guide and slides switch assembly 38 is assembled as follows. Spring 517 is placed in bore 669 of housing 657 of carrier 515 and member 520 is pressed into place in channel 661 with projection 690 snapping over shoulder 680 and pin 682 locating in hole 691. Contact spring member 522 is pressed into channel 662 with pin 684 locating in hole 709 and tab 712 compressing to hold the member 522 in the channel 662. Springs 511 and 512 and detent plungers 508 and 509 are placed in the bores in posts 653 and 654 respectively. The tracking paths of the slide switch assembly contacts 706, 693, 694 and 695 and detent plungers 508 and 509 are lubed with a light grease such as Nye 723 TM available from William F. Nye, Inc., New Bedford, Mass. The bearing surface of carrier 515, namely the projections 687, 688, 790, and 791, the rim 664, and the surfaces 793 and 794 are lubed with viscous motion damping grease, such as Nye 779. Preferably, the viscosity at 210° F. is 600 centistokes. Carrier 515 is then placed in chamber 590. Plungers 525 and 526 are placed in bores 628 and 629 respectively in light guide 33 with shoulders 714 contacting necks 632 to prevent their dropping through. Pad 528 is placed in light guide channel 634 with domes 718, 719 and 720 entering bores 629, 628 and 627 respectively. Circuit board 27 surface 26 is then placed over tne back (FIG. 4) of light guide 33 with the lower surface 734 in FIG. 9 aligning with the lower side of rib 794 in FIG. 4 and the right side of the guide 33 in FIG. 4 aligning with the left side of circuit board 27 in FIG. 9. Pins 622 and 623 and posts 625 and 626 of light guide 33 fit into bores 740, 741, 744 and 743 respectively in clrcuit board 27. Post 626 is spin staked to fasten circuit board 27 to light guide 33 and form an integral lignt guide/sliding switch unit 33A. Bulbs 531 and 533 are placed in sockets 530 and 532 and the sockets are inserted into bores 746 and 747 in circuit board 27 and given an eighth of a turn to lock them in place, the contacts in the sockets 530 and 532 contacting traces about the bores 746 and 747 on the back of the circuit board. The switch assembly 35 (FIG. 1A) is placed in housing 40 then the light guide/circuit board unit 33A is placed also in housing 40, and screws 75A and 75B are placed through bores 620 and 621 respectively in light guide 33 and screwed into bores 798 and 799 (FIG. 1B) respectively in housing 40. Spring 506 is placed in groove 627B in light guide 33 and spring 504 and plunger 503 are placed in bore 639. Button 15 is placed into spring 504 and bore 627. Button 12 is placed in position over light guide 33 with pins 547 and 548 in bearings 643 and 644 respectively and tape 500 is placed in position on the light guide 33 with opening 542 slipping over lever housing rim 675. Cover 18 is then placed over the assembly with lever prongs 539 being inserted through slot 752 in cover 18 into channel 670 in lever housing 659 to hold the tape 500 in position as the cover is dropped into plade, with rim 778 of cover 18 locating agalnst surface 604 (FIG. 3) and backing up to ridge 603 in light guide 33 to trap tape 500 in channel 717, and with button 12 passing through aperture 556 and button 15 through aperute 750 and the brim 546 of button 12 fitting between rims 754A and 754B about aperture 556 to form labyrinth 873. Brim 568 of button fits around rim 753 to form labyrinth 852. Screws 58 and 59 are then passed through holes 802 and 803 in housing 40, and notch 805 and bore 745 respectively in circuit board 27 and screwed into bores 785 and 784 respectively in cover 18, whlle screw 57A, is passed through holes 57B in housing 40, 57C in membero3 and into bore 786 to attach the cover to the housing 40. A 0.015 inch thick polycarbonate applique 800 with various indicia, and openings corresponding to theopenings opeings in cover 18 (except wells 767 aqd 768 is attached to the front of cover 18. Lever 16 is then pushed home with lips 540 snapping behind shoulder 671 in lever housing 659 in carrier 55, and shoulder 537 of lever 16 trapping tape 500 between it and the rim 676 of lever housing 659.

The invention operates as follows. When ever 16 is moved as far as it goes to the left in FIG. 2, tne contacts 693, 694 and 695 on member 520 all contact trace 807 on circuit board 27. The bar shorts to no effect. When the lever 16 is moved all the way to the right in FIG. 2, contacts 69 and 695 cross insulating area 808 and contact trace 809, which completes circuit 810 and turns on the automobile interior light, while at the same point detent plunger 509 clicks into the indentation 611 of detent ramp 609 to give a tactile and audible indication of the switch being activated. When lever 16 is all the way to the left, the contacts 706 of contact blade 703 contact trace 812 on circuit board 27 and contacts 814 on blade 702 contact silveredarea 816 on circuit board 27. In this position the full resistance 817 is in the circuit 820 and therefore the panel lights are essentially off When lever 16 is moved about 0.06 inches to the right, contacts 814 contact resistor strip 817 which is preferably made of carbon. At this point slightly less of resistance 817 is in the circuit and the panellights light dimly. As lever 16 is moved further to the right, contacts 814 move further to the right across resistance strip 817 ano progressively less resistance is in the circuit 820 and the panel lights grow progresslvely brighter. When lever 16 is moved all the way to the right, contacts 814 contact silvered area 818 which is directly connected to trace 821 and the panel lights are at full voltage. The detent 509 also clicks into ramp 609 to indicate the full brightness has been reached. Button 12 is pivotable about pivot pins 547 and 548 in the bearing comprising areas 643 and 645 of light guide 33 and 755 and 756 of cover 18. When pushed on to the left side, it rocks to the left and qontact member 562 is pushed down on plunger 525 which pusnes the coqtact of dome 718 into contact with traces 824 and 825 on circuit board 27 shorting across them to turn on the headlights. Likewise. pushing dn the right side of button 12 pushes contact member 563 against plunger 526 to cause contact 727 to short traces 826 and 827 to turn on theparking lights. In a similar manner passing on button 15 acts through light pipe 577 to force the contactof dome 720 to short traces 829 and 830 wnich turns the lights off. All the switches described work through a microprocessor which is connected to traces 832 on flange 733 of circuit board 27 by a connector (not shown) and wiring harness (not shown).

It is seen that the light means 834 comprises the lights 531 and 533 and sockets 530 and 532. The lever means comprises lever 16, the cover means 836 includes cover 18 as well as buttons 12 and 15, which also serve to cover the light guide 33 and which also have indicia in them. The tape means comprises tape 500, the means for guiding 758 comprises rim 778 and channel 777 including their portions on flange. 760, and the means for preventing 840 comprises lever housing 659 and in. particular rims 676 and 675.

A feature of the invention is that the sliding switch assembly 31 is entirely encapsulated by light guide 33 andcircuit board 27. A number of problems were solved to accomplish this, and the result is a compact and durable switch. One problem that has solved was that the movement of the sliding mechanism is rough and irregular if the switch is designed following the art of push button switches. Instead of the broad bearing surfaces as used in push button switches, the carrier 515 is designed so contact is made with the light guide 33 only along narrow bearing surfaces, such as 687, 688 and rim 664. In addition, a viscous grease is applied to these surfaces to provide a pleasant, smooth, feel to the switch. For specifity in the claims, "narrow" with respect to the bearing surfaces is defined as being less than one-third the width of the entire available surface area. Preferably the width of the bearing surfaces is less than one-tenth of theavailable surface area.

Another problem that was solved was the problem of leaking of light from the light guide 33 past the sliding lever 16. The combination of a sliding tape 500, a guide means 758 for guiding the tape around the compact contour of the switch, and the means 840 for preventing light from escaping through the opening 542 in the tape solved this problem. The first rim 675 fits snugly in opening 542 and the second rim 676 has dimensions larger than the first rim 675 and the opening 542 in the tape and is located to prevent light from the light guide 33 from passing through the opening 542. Preferably, the rim 676 is flush with the surface 604 of the light guide in which tape 500 rests. Thus the tape lies flat across the surface 604 and rim 676 and no light can pass between it and the rim 676. The snvg fit of the tape 500 about rim 675 further insures that light cannot escape this interface.

Another feature of the invention is that all moving parts are under spring tension which prevents motion in any direction. Spring 517 maintains member 520 under tension ln one direction while the upright ends such as 689 and projection 690 maintain tension in the other direction. Blades 702 and 703 maintain tension on member 522 in one direction while tab 712 maintains tne tension the other directions. Domes 718 and 719 and spring 504 and plunger 503 act agianst return ramp 560 to return the button 12 to neutral maintain button 12 under tension. Spring 506 maintains tension on button 15. And the spring 517 and blades 702 and 703 also maintain the carri 515 under tension. This application of tension to all movable prevents looseness and the rattling that could otherwise result from variations or wear.

Another feature of the invention is that contacts 693, 694, 695, 706 and 814 exert very low pressure on of circuit board 27. The pressure exerted by a single contact typically about 2 ounces. This pressure is significantly lower than ¼ as much) than the pressure normally associated with switching actions by the fingers or other limbs of humans. This is because the contacts act in a direction perpendicular to and thus of the direction of manual operation of lever 16.

A novel, sliding switch with lighted indicia which does not become loose with wear, is compact and has many other features and advantages has been described. It is evident that those skilled in the art may now make many modifications and uses of the specific embodiment described without departing from the inventive concepts. For example, many other sizes, shapes and materials may be used for the parts, or the various features may be placed on a different part. Other features may be added, or it may be used by itself or incorporated in other module designs. Consequently the invention is to be constructed as embracing each and every novel feature and novel combination of features present in the switch described.

What is claimed is:

1. A switch comprising
a first housing forming a chamber having open end, said chamber being made of a light guide material, having aperture therein, and having a bearing surface thereon;
a circuit board substantially closing end of said chamber;
an electrical circuit including a trace said circuit board;
light means mounted on said circuit board for illuminating said light guide material;

a contact carrier slidable within said against said bearing surface and in a plane parallel to the surf said circuit board;

at least one contact mounted on said carrier and engagable with said trace; and lever means extending through said aperture for moving said carrier in said plane to activate said electrical circuit.

2. A switch as in claim 1 wherein sai comprises a slot and further comprising:

a generally opaque cover means for said first housing, said cover means having a slot and one or more transmitting areas; and opaque tape means located between said housing and said cover means for moving with said lever means to prevent light from escaping through said slot in said cover means.

3. A switch as in claim 2 and further a means for guiding said tape means around a substantially 90° corner in said housing.

4. A switch as in claim 3 wherein said for guiding comprises a channel in said cover means.

5. A switch as in claim 2 wherein: said tape means has an opening in it; said lever meahs comprises a lever member through said slot in said first housing, said opening in said tape means, and said slot in said cover means, and further including an means for preventing light from escaping through said opening in said tape means.

6. A switch as in claim 5 wherein said means for preventing comprises a lever housing extending from said contact carrier, said lever housing having a channel for receiving said lever member and first and second rims about said channel, said first rim extending through said slot in said first housing and said opening in said tape means, said second rim having dimensions larger than said first said opening in said tap to prevent light from said light guide material from passing through said opening in said tape means.

7. A switch as in claim 6 and further a shoulder means on said lever member for trapping said tape means between said lever and said second rim.

8. A switch as in claim 1 and further ng means for limiting contact between said bearing surface and said to areas that are narrow compared to the size of said carrier.

9. A switch as in claim 8 wherein said for limiting comprises ribs on said carrier.

10. A switch as in claim 9 and further including a viscous grease applied to said ribs.

11. A switch as in claim 1 wherein said contact comprises a low pressure contact means for contacting said trace with a contact force significantly lower than the force normally associated with limb motions of adult humans.

12. A switch as in claim 1 wherein said housing includes a detent ramp and said carrier includes detent means engaging said detent ramp to provide a change in feel in said lever means a predetermined location relative to said trace on said circuit board.

* * * * *